(12) United States Patent
Toporek et al.

(10) Patent No.: US 6,460,085 B1
(45) Date of Patent: Oct. 1, 2002

(54) METHOD AND SYSTEM FOR MANAGING MEMORY IN AN INTERNET OVER SATELLITE CONNECTION

(75) Inventors: Jerome D. Toporek, Venice; Jeremy A. McCooey, Los Angeles; Marc B. Hasson, Redondo Beach; Timothy W. Hartrick, Los Angeles, all of CA (US)

(73) Assignee: Mentat Inc., Los Angeles, CA (US)

( * ) Notice: Subject to any disclaimer, the term of this patent is extended or adjusted under 35 U.S.C. 154(b) by 0 days.

(21) Appl. No.: 09/306,678

(22) Filed: May 6, 1999

Related U.S. Application Data

(63) Continuation-in-part of application No. 09/243,185, filed on Feb. 2, 1999.

(51) Int. Cl.$^7$ .............................................. G06F 15/16
(52) U.S. Cl. ..................... 709/233; 709/234; 709/232; 370/395
(58) Field of Search .................... 709/230, 239, 709/200, 203, 245, 249, 213, 238, 224, 232, 233, 234; 370/230, 395, 468, 316, 231, 233

(56) References Cited

U.S. PATENT DOCUMENTS

| | | | |
|---|---|---|---|
| 5,163,046 A | | 11/1992 | Hahne et al. |
| 5,313,454 A | * | 5/1994 | Bustini et al. ................. 370/13 |
| 5,426,635 A | | 6/1995 | Mitra et al. |
| 5,594,490 A | | 1/1997 | Dawson et al. |
| 5,784,358 A | * | 7/1998 | Smith et al. ................. 370/230 |
| 5,850,517 A | | 12/1998 | Verkler et al. |
| 5,852,721 A | | 12/1998 | Dillon et al. |
| 5,896,558 A | | 4/1999 | Wiedeman |
| 5,897,622 A | | 4/1999 | Blinn et al. |
| 5,912,883 A | | 6/1999 | Hershberg |
| 5,968,129 A | | 10/1999 | Dillon et al. |
| 6,038,216 A | | 3/2000 | Packer |
| 6,098,108 A | * | 8/2000 | Sridhar et al. ............... 709/239 |
| 6,130,880 A | | 10/2000 | Naudus et al. |
| 6,161,141 A | * | 12/2000 | Dillon ......................... 709/230 |
| 6,215,776 B1 | * | 4/2001 | Chao .......................... 370/316 |
| 6,292,839 B1 | * | 9/2001 | Naudus et al. .............. 709/238 |
| 6,298,041 B1 | * | 10/2001 | Packer ....................... 370/231 |

FOREIGN PATENT DOCUMENTS

| | | |
|---|---|---|
| WO | WO 98/47166 | 10/1998 |

OTHER PUBLICATIONS

Rogers, Amy, *Bandwidth Bargain (Structured Internetworks and Fourelle Systems Inc. Introduce Products That Can Save Bandwidth and Eliminate or Postpone the Need for Installing a T1 Line)*, Communications Week, Jul. 21, 1997, p. 1.

Lapolla, Stephanie, *Speeding Links to ISPs. (Fourelle Systems Inc. Introduces New Compression Technology) (Brief Article) (Product Announcement)*, PC Week, Aug. 18, 1997, vol. 14, No. 35, p. 134.

O'Shea, Dan, *Compress and Conquer*, Telephony, Oct. 20, 1997, vol. 233, No. 16, p. 26.

Glenn, Patrick, *Fourelle's Venturi Compression Technology Adopted by Wireless Internet Industry Leaders*, Business Wire, Oct. 27, 1997, p. 10270175.

(List continued on next page.)

*Primary Examiner*—Ayaz Sheikh
*Assistant Examiner*—O. Duong
(74) *Attorney, Agent, or Firm*—Townsend and Townsend and Crew, LLP

(57) ABSTRACT

According to the present invention, a technique for managing memory for storing information communicated over one or more TCP connections over a wireless wide area network is provided. In an exemplary embodiment, the present invention provides methods and systems for controlling the buffering of information that flows over a TCP connection to an Xpress Transport Protocol (herein "XTP") connection, for example.

29 Claims, 12 Drawing Sheets

OTHER PUBLICATIONS

Fourelle Systems, Inc., *Wireless: Independent Tests Confirm Wireline/wireless Performance of Fourelle's Compression Technology, (Fourelle Systems Inc's Venturi Technology) (Product Information), EDGE: Work–Group Computing Report,* vol. 8, pp. 20–21.

Garcia, Martha L., *Fourelle's Venturi Quadruples Performance on WISP Inc.=Wireless Internet Service Providers—Cusomer Network, Business Wire,* Aug. 6, 1998, p. 8061017.

Flash Networks Ltd., *Flash Networks Announce Availability of BoosterWare for Unix Enhanced Communications of up to 500*, PR Newswire, May 27, 1998, p. 527HSW001A.

Rogers, Amy, *Slow Modem Blues? (Flash Networks Adds to its Boosterware line of IP Offerings; Xircom launches 56–kilobit per second upgrade for its modems), CommunicationsWeek,* Jun. 23, 1997, p. 23.

Flash Networks Ltd., *Achieve Internet Access in a Flash, Lan Times,* Jul. 21, 1997, vol. 14, No. 15, p. 37.

Flash Networks Ltd., *TCP/IP Software, Data Communications,* Nov., 1997, vol. 26, No. 15, p. 48H.

Flash Networks Ltd., *SatBooster Enhances Internet Communications Over Satellite Links by up to Five Times; BoosterWare Technology Speeds TCP/IP Satellite Transmission, Business Wire,* Dec. 10, 1997, p. 12100059.

Roberts, Erica, *Torquing Up: TCP/IP, Data Communications,* Jan., 1998, vol. 27, No. 1, p. 42.

MIT Lincoln Labs, *Satellite and LMDS React Differently to Latest Spectrum–Sharing Proposal, Satellite Week,* Apr. 3, 1995.

\* cited by examiner

Window Size vs. Throughput

Delay vs. Throughput

Bit Error Rate vs. Throughput (10Mbps Link)

METHOD AND SYSTEM FOR MANAGING MEMORY IN AN INTERNET OVER SATELLITE CONNECTION

CROSS-REFERENCES TO RELATED APPLICATIONS

The present application is a continuation-in-part of U.S. patent application Ser. No. 09/243,185, in the name of Jerome D. Toporek et. al., titled, "Internet Over Satellite System," filed Feb. 2, 1999, the entire contents of which are incorporated herein by reference for all purposes.

The following two commonly-owned co-pending applications, including this one, are being filed concurrently and the other application is hereby incorporated by reference in its entirety for all purposes:

1. U.S. patent application Ser. No. 09/306,236, in the name of Jerome D. Toporek et. al., titled, "Method And System For Controlling Data Flow In An Internet Over Satellite Connection," and
2. U.S. patent application Ser. No. 09/306,678, in the name of Jerome D. Toporek et. al., titled, "Method And System For Managing Memory In An Internet Over Satellite Connection".

BACKGROUND OF THE INVENTION

The present invention relates to telecommunication techniques. More particularly, the present invention provides a technique including methods and systems for managing memory in a TCP over satellite system for use in a wide area network of computers such as the Internet. The present invention provides a controlled memory management in equipment for high speed and quality transmission of signals to a distant location over a satellite system using an Xpress Transport Protocol (herein "XTP") protocol, for example. But it will be recognized that the invention has a much wider range of applicability; it can also be applied to a private bridged network, terrestrial wireless network links, and the like.

The Internet is an international "super-network" connecting together millions of individual computer networks and computers. The Internet is generally not a single entity. It is an extremely diffuse and complex system over which no single entity has complete authority or control. Although the Internet is widely known for one of its ways of presenting information through the World Wide Web (herein "Web"), there are many other services currently available based upon the general Internet protocols and infrastructure.

The Web is generally easy to use for people inexperienced with computers. Information on the Web can be presented on "pages" of graphics and text that contain "links" to other pages either within the same set of data files (i.e., Web site) or within data files located on other computer networks. Users often access information on the Web using a "browser" program such as one made by Netscape Communications Corporation of Mountain View, Calif. or Microsoft Corporation of Redmond, Wash. Browser programs process information from Web sites and display the information using graphics, text, sound, and animation. Accordingly, the Web has become a popular medium for advertising goods and services directly to consumers.

The Internet supports many other forms of communication. For example, the Internet allows one-to-one communication via electronic mail, which is commonly known as "e-mail." The Internet also has "bulletin boards" which are used by users to post colorful text and graphics for others to read and respond to. For real time communication, the Internet has "chat rooms" and the like, which allow users to communicate to each other by way of typed messages. In some cases, the Internet can also be used for voice communication between users. All of these forms of communication are possible, at least in part, by way of an important connection, which allows information to be transmitted from many different servers on the Internet.

The Internet is based on the TCP/IP protocol suite. At the network layer, an Internet Protocol, which is known as IP, provides a mechanism to deliver packets addressed to individual computers. The Internet has a plurality of computer systems implementing IP, which are generally interconnected to each other using local area networks and dedicated transmission lines, to form a wide area network of computers. IP packets are delivered on a best effort basis and are not guaranteed to arrive at their intended destination, which is known as "unreliable" service.

For many applications that require reliable data delivery service, the Internet uses a connection mechanism called Transmission Control Protocol, which is known as TCP. TCP has a variety of desirable characteristics that allows it to be suitable for communication over the Internet. For example, TCP considers the data size or best sized segment of data to send from a transmitting server over the communication medium to a receiving server. Additionally, TCP maintains a timer, which waits for the receiving server to send an acknowledgment of the reception of the data segment from the transmitting server. If the timer times out before the acknowledgment is received, TCP resends the data segment, which provides reliability in the communication. TCP also maintains a checksum on its header and data, which monitors any modification in the data in transit. If the data arrives with an invalid checksum, TCP discards the data and does not acknowledge receiving the data. If data segments arrive out of order, TCP can also recombine the segments in order at the receiving server. Furthermore, TCP provides flow control, which only allows a finite amount of data to be sent to a buffer on the receiving server. This prevents a fast server computer from overflowing all the buffers on a slower server computer.

Although TCP has been well suited for transmitting Internet data between a plurality of servers, which are coupled to each other by way of conventional telephone systems and lines with similar characteristics, TCP has many limitations. For example, TCP is suitable for "short hops" but often slows down communication over extremely long distances which can have significant latency (e.g., transcontinental hops via satellite). Here, the flow control and acknowledgment features take too long to send and receive, which make communication slow. Additionally, opportunities for gains in efficiency still exist. In particular, high speed transmission of Internet data over a satellite network, for example, to a relatively slower recipient, such as modem, and the like, can cause congestion. Additionally, pathological conditions can arise in networking using satellites, that can cause resource exhaustion in systems, which leads to further slowing of TCP connections.

From the above, it is seen that a more efficient way of managing memory in the transmission of information for Internet services over large geographical regions using a wireless communication media is highly desirable.

SUMMARY OF THE INVENTION

According to the present invention, a technique for managing memory for storing information communicated over one or more TCP connections over a wireless wide area network is provided. In an exemplary embodiment, the present invention provides methods and systems for controlling the buffering of information that flows over a TCP connection to an Xpress Transport Protocol (herein "XTP") connection, for example.

In a specific embodiment, the present invention provides a method for managing memory for buffering information communicated over an internet connection established across a satellite link. The method can be operable on a large variety of systems, such as a system comprising one or more clients, one or more servers, a first gateway connected to at least one client, a second gateway connected to at least one server, and a wireless telecommunications link between these gateways. The method includes intercepting a connection attempt with a server initiated by a client. The client will attempt a connection that will have a first characteristic data rate. A connection can be established between a first gateway and a second gateway over the telecommunications link, that can be a satellite link or the like. This connection will have a second characteristic data rate. The first gateway can include a buffer for storing information received over the telecommunications link from the second gateway and a buffer for storing information to be sent to the client. The method can perform a step of determining a state in the receive buffer. The state can indicate whether the characteristic data rate in the telecommunications link is substantially greater than the characteristic data rate for the client. A step of setting a receive window size for the client at the first gateway to reduce an amount of data received over the telecommunications link for the client can also be part of the method. The combination of these steps can provide a method for managing memory for buffering information coming from the telecommunications link in the first gateway.

In another aspect of the present invention, a system for controlling the flow of information over a satellite is provided. The system can include at least one client, selected from a plurality of potential clients and at least one server, selected from a plurality of potential servers. The system can also include a first gateway, connected to the client by a first telecommunications link, and a second gateway, connected to the server by a second telecommunications link. A third telecommunications link connecting the first gateway to the second gateway can also be part of the system. The system is operative to intercept a connection attempt with the server initiated by the client at a first characteristic data rate. The system can then establish a connection between the first gateway and the second gateway over the third telecommunications link. This connection will have a second characteristic data rate. The first buffer stores information received over the third telecommunications link and the second buffer stores information to be sent to the client. The system can determine a state in the first buffer. The state indicates that the second characteristic data rate in the third telecommunications link is greater than the first characteristic data rate for the client. The system can also set a receive window size for the client at the first gateway to reduce an amount of data received over the third telecommunications link for the client.

In a yet further aspect according to the present invention, a computer program product for controlling the flow of information over a wireless data link is provided. The data link can comprise one or more connections. The computer program product comprises a computer readable storage medium for holding a plurality of code. Code for intercepting a connection attempt with a server initiated by a client at a first characteristic data rate is included in the program product. Further, code for establishing a connection between a first gateway and a second gateway over a telecommunications link at a second characteristic data rate is also included. A first buffer in the first gateway stores information received over the telecommunications link and a second buffer stores information to be sent to the client. The product can also include code for determining a state in the first buffer. The state indicates a condition where the characteristic data rate of the telecommunications link is substantially greater than that of the client. If this condition is detected, then the product invokes code for setting a receive window size for the client at the first gateway to reduce an amount of data received over the telecommunications link for the client.

Numerous benefits are achieved by way of the present invention over conventional techniques. In a specific embodiment, the techniques according to the present invention can quickly resize the receive window to achieve a match between the data rate of a sender and the data rate of a receiver of a TCP connection over a satellite link. In some embodiments, the techniques of the present invention can be applied to each satellite connection separately, so that one slow receiver will not degrade performance of other connections over the same link. In many embodiments, the present invention provides for a management of buffer memory in a novel protocol which is suitable for long latency, high loss, asymmetric bandwidth conditions, which are typical of satellite communications. The present invention also provides for relatively easy implementation into a conventional satellite system. Depending upon the embodiment, one or more of these benefits can be present. These and other advantages or benefits are described throughout the present specification and are described more particularly below.

These and other embodiments of the present invention are described in more detail in conjunction with the text below and attached Figs.

DESCRIPTION OF THE SPECIFIC EMBODIMENTS

Figure 1:
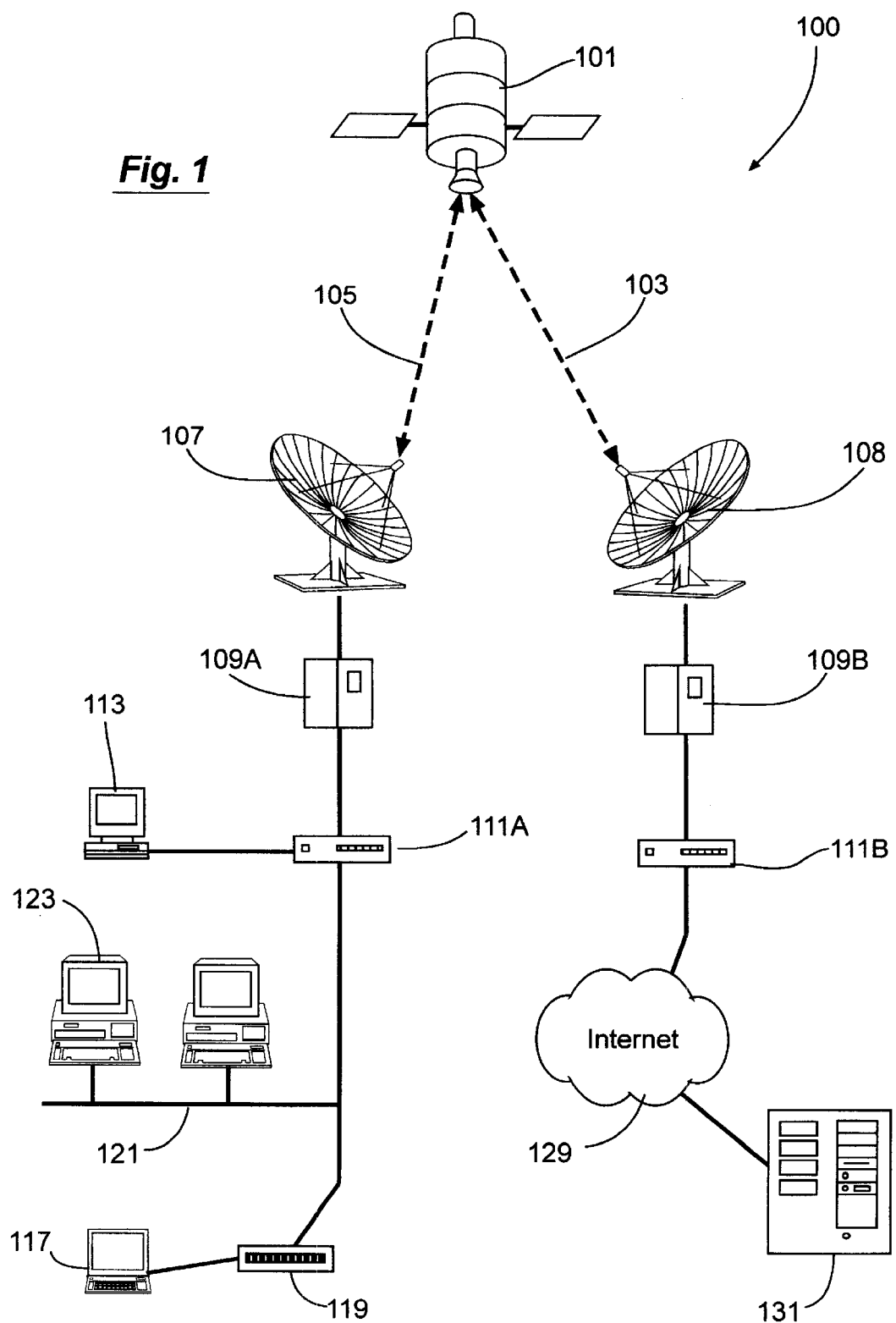
FIG. 1 is a simplified diagram of a satellite system according to an embodiment of the present invention.

Before discussing the various embodiments, it may assist the reader to more fully understand the limitations of using TCP over a satellite network. Some of these limitations are described more fully below.

Congestion Avoidance: In order to avoid the possibility of congestive network meltdown, TCP generally assumes that all data loss is caused by congestion and responds by reducing the transmission rate. Over satellite links, however, TCP often misinterprets the long round trip time and bit errors as congestion and responds inappropriately. Similarly, the TCP "Slow Start" algorithm, which over the terrestrial infrastructure prevents new connections from flooding an already congested network, over satellites forces an excessively long ramp-up for each new connection. While these congestion avoidance mechanisms are important in routed environments, they are often ill-suited to satellite links.

Data Acknowledgments: The simple, heuristic data acknowledgment scheme used by TCP generally does not adapt well to long latency or highly asymmetric bandwidth conditions. To provide reliable data transmission, the TCP receiver often constantly sends acknowledgments for the data received back the sender. The sender generally does not assume any data is lost or corrupted until a multiple of the round trip time has passed without receiving an acknowledgment. If a packet is lost or corrupted, TCP can retransmit all of the data starting from the first missing packet. The algorithm may not respond well over satellite networks where the round trip time is long and error rates are high. Further, the constant stream of acknowledgments frequently wastes precious back channel bandwidth. If the back channel bandwidth is small, the return of the acknowledgments to the sender can become the system bottleneck in some cases.

Window Size: TCP utilizes a sliding window mechanism to limit the amount of data in flight. When the window becomes substantially full, the sender stops transmitting data until it receives new acknowledgments from the destination server. Over satellite networks, where acknowledgments are slow to return, the TCP window size generally sets a hard limit on the maximum data throughput rate. The minimum window size often needed to fully utilize an error-free link, known as the "bandwidth-delay product," is 100 Kbytes for a T1 satellite link and 675 Kbytes for a10 MBps link, for example. Bit errors can increase the required window size further. However, most implementations of TCP/IP are often limited to a maximum window size of 64 KB and many common operating systems use a default window size of only 8 KB, imposing a maximum throughput rate over a satellite link of only 128 Kbps per connection, regardless of the bandwidth of the data pipe.

According to the present invention, a technique for managing memory for one or more TCP connections over a wireless wide area network is provided. In an exemplary embodiment, the present invention provides a method and system for memory management for buffering information transmitted over a TCP connection to an XTP connection, which is more suitable for transmission over a wireless network system such as a satellite system. Details of the present method and system are described throughout the present specification and more particularly below.

FIG. 1 is a simplified diagram of a satellite system 100 according to an embodiment of the present invention. This diagram is merely an illustration and should not limit the scope of the claims herein. One of ordinary skill in the art would recognize other variations, modifications, and alternatives. Among other features, the system 100 includes a satellite network system, which has satellite(s) 101. The satellite 101 receives and transmits information between a plurality of ground stations 107, 108 or satellite dishes. Each satellite ground station includes a satellite dish, and a satellite modem 109A, 109B or other form of receiver such as a VSAT indoor unit, which is coupled, directly or indirectly to a satellite gateway 111A, 111B.

Satellite antenna 108 receives and transmits signals 103 through satellite 101. Satellite antenna 108 connects to satellite gateway 111B that couples to a wide area network such as the Internet 129 or an internet, which is coupled to a server 131. The gateway 111B also couples through satellite modem 109B. The server and the Internet communication occur in a common protocol such as TCP/IP, UDP/IP or the like. The satellite gateway will be described in more detail below.

Satellite antenna 107 receives and transmits signals 105 through satellite 101. Satellite antenna 107 connects to satellite gateway 111A that couples to a local area network such as Ethernet, Token Ring, FDDI, or others 121, which is coupled to computer terminals 123 or clients. Here, satellite gateway couples to laptop 117, which is coupled through modem 119. The client, the laptop, and the local area network use a common connection format such as TCP/IP, IPX/SPX, or the like. The satellite gateway will be described in more detail below.

In a specific embodiment, satellite gateway 111A intercepts a TCP connection from a client and converts data 105 to a satellite protocol for transmission over satellite 101. The gateway 111A also couples through satellite modem 109A, which transmits data to satellite 101. The satellite gateway 111B on the opposite side of the satellite link translates the data in the satellite protocol back to TCP for communications with the server 131. In a specific embodiment, the present method provides improved performance over conventional techniques. Additionally, the present method remains substantially transparent to an end user and is fully compatible with the Internet or an internet infrastructure. In many, if not all aspects, no substantial changes are required to the client or server. In preferred embodiments, applications continue to function without substantial hardware and/or software modifications.

Although the above has been described in terms of a specific networking diagram, it is possible to implement the present satellite gateway in other configurations. For example, the present satellite gateway can be one "hub" or central gateway that serves a plurality of remote gateways. Each of the remote gateways is connected to the central gateway to create an individual satellite link.

Other common network topologies can also be used. Further, in some embodiments, different telecommunications links can be used to carry forward and backward paths of a connection. For example, a satellite link can be used to carry data on the forward path, while telephone line can be used for the backward path. Other types of telecommunications hardware may be substituted for the example hardware described here without departing from the scope of the present invention.

Additionally, the present satellite gateway is generally described as a stand alone unit. It will be recognized, however, that the present gateway can be implemented or integrated into a client machine. For example, the present gateway can be implemented on a personal computer using a satellite card, which can be inserted into a Windows™ 98 machine. The present gateway can also be implemented on other operating systems such as Windows NT, MacOS, and Linux. Of course, the exact manner of implementation will depend upon the application.

Additionally, the present satellite gateway may be integrated into a standalone satellite modem, VSAT hardware, router or other network devices.

I. Protocol Design

In a specific embodiment, the present method includes a novel satellite protocol, which provides improved throughput for satellite networks. The present protocol can be designed to respond efficiently to typical satellite latency, bit errors, and asymmetric bandwidth conditions. The present protocol also can take advantage of optimizations possible on a point-to-point link with fixed bandwidth. For further information regarding satellite protocols, such as XTP, reference may be had to Tim Strayer, "A Brief Introduction to the Xpress Transport Protocol," which is incorporated herein by reference in its entirety for all purposes. These and other features of the present satellite protocol are described in more detail below.

The present protocol utilizes an efficient selective retransmission algorithm for the acknowledgment of data. Because the hop over the satellite is a point-to-point link with no intermediate routing, any gaps in the packet sequence can be assumed to be data loss due to corruption. The receiving satellite gateway requests retransmission immediately upon detection of the missing data from the transmitting satellite gateway.

The present protocol is substantially free from the frequent acknowledgment features of conventional TCP. In some embodiments, the present protocol does not use acknowledgments as the primary means of identifying lost data. In these embodiments, the present protocol needs only infrequent acknowledgments to confirm data arrival and clear buffers. (Conventional TCP sends a constant stream of acknowledgments over the reverse channel.) The present protocol reduces back channel usage by 70% or more, thereby increasing the performance of networks where limited back channel bandwidth is the system bottleneck.

The present protocol offers adequately large window sizes for transmission of data between the satellite gateways. Because the bandwidth-delay product over the satellite between the satellite gateways is much larger than that from the satellite gateway to the end node, the large present protocol window enables the bandwidth-delay product to window size ratio to remain relatively constant. The present gateway becomes a buffer for the network, allowing high throughput independent of the window size of the clients and servers.

The present protocol generally does not use unnecessary congestion avoidance mechanisms for the hop over the satellite between the satellite gateways. The present system, however, continues to use "Slow Start" and all other standard TCP congestion avoidance algorithms for the terrestrial connections between the present gateways and the end nodes. The present protocol also uses a streamlined handshake mechanism to reduce the number of round-trip times required for connection set-up.

The present methods and systems can run with IP for compatibility with routed networks. Alternatively, it can run directly over the link layer for substantially improved performance in most instances. Depending upon the embodiment one or more of these features can be available.

The above has generally been described in terms of desirable features of the present satellite protocol. It would be recognized that many other types of features can be available. Additionally, the present invention does not necessarily require each of the above features. Any combination can be used depending upon the application. One of ordinary skill in the art would recognize other variations, modifications, and alternatives.

II. Xpress Transport Protocol

In a preferred embodiment, the present invention provides an "Xpress Transport Protocol," which is commonly known as XTP. XTP provides orthogonal protocol functions for separation of implementation from policy, separation of rate and flow control, explicit first-class support for multicast, and data delivery service independence. XTP has a variety of suitable characteristics for transmission of data over a satellite link, which are described more fully below.

In a specific embodiment, the present protocol includes a set of mechanisms whose functionality is orthogonal. The most notable effect of this is that XTP separates communication mechanism (e.g., data-gram, virtual circuit, transaction, etc) from an error control policy employed (fully reliable through uncorrected). Further, flow and rate control as well as error control can be tailored to the communication at hand. If desired, any set of these control procedures can be turned off.

The present protocol also provides for separation of rate and flow control. In general, flow control operates on end-to-end buffer space. Rate control is a producer/consumer concept that considers processor speed and congestion. TCP does not provide rate control, and combats congestion with slow-start and other heuristics. XTP provides mechanisms for shaping rate control and flow control independently.

In a specific embodiment, the present protocol provides explicit multicast support. Here, multicast is not an afterthought in XTP. Each mechanism used for uni-cast communications is available for multicast use as well.

The present protocol also has data delivery service independence. In particular, XTP is a transport protocol, yet with the advent of switched networks rather than routed networks, a traditional network layer service may not be appropriate in every instance. XTP generally requires that the underlying data delivery service provides framing and delivery of packets from one XTP-equipped host to another. This could be raw MAC or IP or AAL5. XTP also employs parametric addressing, allowing packets to be addressed with any one of several standard addressing formats. Other features of XTP include, among others, implicit fast connection setup for virtual circuit paradigm; key-based addressing lookups; message priority and scheduling; support for encapsulated and convergence protocols; selective retransmission and acknowledgment; and fixed-size 64-bit aligned frame design.

XTP defines the mechanisms necessary for delivering user data from one end system to one or more other end systems. Each XTP implementation maintains the state of each of its communications. Well-defined packet structures, containing user data or control information, are exchanged in order to effect the user data transfer. The control information is used to provide the requested layer of correctness and to assist in making the transfer efficient. Assurance of correctness is done via error control algorithms and maintenance of a connection state machine. Flow and rate control algorithms, certain protocol modes, and traffic shaping information are used to provide the requested quality of service as efficiently as possible.

The collection of information comprising the XTP state at an end system is called a context. This information represents one instance of an active communication between two (or more) XTP endpoints. A context should be created, or instantiated, before sending or receiving XTP packets. There may be many active contexts at an end system, one for each active conversation or message.

Each context manages both an outgoing data stream and an incoming data stream. A data stream is an arbitrary length string of sequenced bytes, where each byte is represented by a sequence number. The aggregate of a pair of active contexts and the data streams between them is called an association.

A context at an end system is initially in a quiescent state. A user in need of communication services requests that the context be placed into the listening state. The context now listens for an appropriate FIRST packet. The FIRST packet is the initial packet of an association. It contains explicit addressing information. The user should provide all of the necessary information for XTP to match an incoming FIRST packet with the listening context.

At another end system a user requests communication service from XTP. Since this user will initiate the association, the context moves from a quiescent state to an active state directly. The active context constructs a FIRST packet, complete with explicit addressing information from the user. The FIRST packet is sent via the underlying data delivery service.

When the FIRST packet is received at the first host's XTP implementation, the address is compared against all listening contexts. If a match is found, the listening context moves to the active state. From this point forward an association is established, and communication can be completely symmetric since there are two data streams, one in each direction, in an association. Also, no other packet during the lifetime of the association will carry explicit addressing information. Rather, a unique "key" is carried in each packet that maps the packet to the appropriate context.

Once all data from one user has been sent, that data stream from that user's context can be closed. Sentinels in the form of options bits in a packet are exchanged to gracefully close the connection. Other forms of less graceful closings are possible by abbreviating this exchange. When both users are done, and both data streams closed, the contexts move into the inactive state. One of the contexts will send a sentinel that causes the association to dissolve. At this point, both contexts return to the quiescent state.

Generally all of XTP's packet types use a common header structure. All of the information necessary to steer the packet's payload to the proper point of processing is carried in the header. Much of how an XTP context operates is controlled by a set of bit flags that are concentrated in one field in the packet header. Fifteen flags are defined, including bit flags to control connection shutdown, bit flags to control the acknowledgment policy, and bit flags that are markers in the data stream. The remaining bit flags control the end-to-end operating modes. Examples include enabling or disabling error control or flow control, or enabling multicast mode.

XTP flow control is based on 64-bit sequence numbers and a 64-bit sliding window. XTP also provides rate control whereby an end system or intermediate system can specify the maximum bandwidth and burst size it will accept on a connection. A Traffic Segment provides a means for specifying the shape of the traffic so that both end systems and intermediate systems can manage their resources and facilitate service quality guarantees.

Error control in XTP incorporates positive and, when appropriate, negative acknowledgment to effect retransmission of missing or damaged data packets. Retransmission may be either go-back-N or selective. The retransmission algorithms are conservative: only data that is shown to be missing via control messages may be transmitted. This avoids spurious and possible congestion-causing retransmissions. The error control algorithm, while basically conservative, can also be aggressive: a method for a quick-acting error notification is provided.

XTP also specifies techniques for extending error control to a multicast environment. The error control algorithm in multicast is identical to the uni-cast algorithm, although additional sophistication is required to manage state variables and achieve continuous streaming. Accordingly, XTP is a preferred satellite protocol according to the present invention.

Although the above has generally been described in using an XTP protocol, it will be understood that other types of protocols can be used. For example, the protocol can be a modified TCP, a modified XTP, and others. Additionally, the protocol can be any that is suitable for transmission over a satellite link. Additionally, one of ordinary skill in the art would recognize other variations, modifications, and alternatives.

Figure 2:
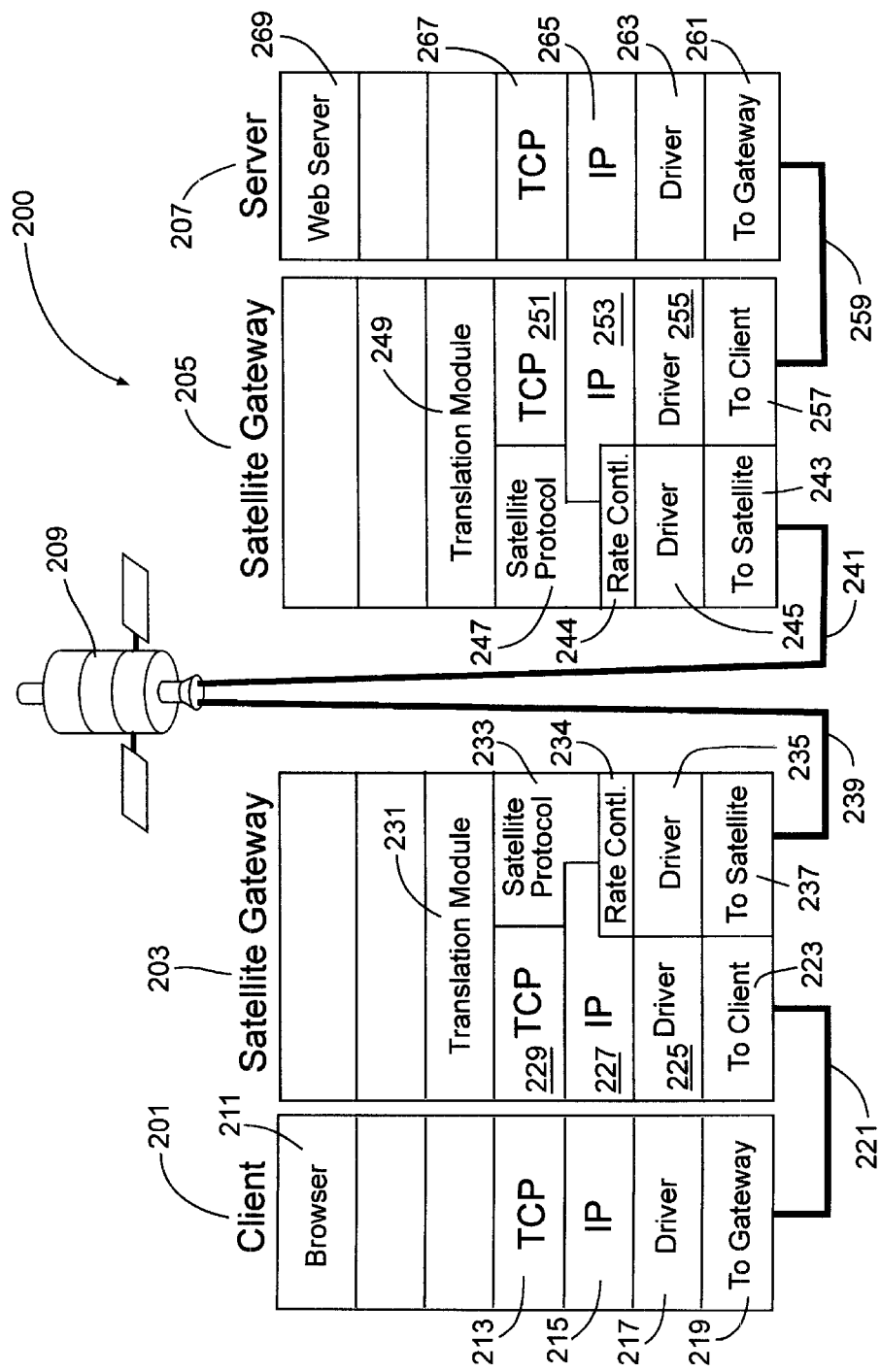
FIGS. 2 and 2A are simplified diagrams of system architectures according to embodiments of the present invention.

FIG. 2 is a simplified diagram of system architecture 200 according to an embodiment of the present invention. This diagram is merely an illustration and should not limit the scope of the claims herein. One of ordinary skill in the art would recognize other variations, modifications, and alternatives. The system architecture 200 includes at least a client 201, which is coupled to a satellite gateway 203, which transmits and receives information via satellite link 209 from a satellite gateway 205. Satellite gateway 205 couples to server 207. Satellite gateway and server couple to each other through the Internet or an internet-like network of computers.

Client 201 can be represented in multiple layers, including application and physical layers. The layers may include a browser 211. The browser 211 allows a user to communicate information from an application layer to a physical layer for transmission to a gateway. The browser 211 is generally in the application layer, which provides the information. For example, the browser can be one of suitable design made by a company called Netscape Communications Corporation of Mountain View, Calif. or Microsoft Corporation of Redmond, Wash. or others. In addition to browsers, other TCP applications, including FTP file transfers, may also be used to communicate between clients and servers.

The information goes through the transport layer (e.g., TCP) 213 and then through the IP layer 215, which is the networking layer. The transport layer provides a flow of data between the client and the gateway. The IP layer handles movement of data comprising packets between the client and the gateway, or other network. The information is sent through the physical layer, which includes a driver 217. The driver 217 transmits the information to the gateway 203 through hardware 219 connected to gateway 203 via a telecommunications link 221, which can be a wire, cable, fiber optic, or other physical communication medium. Alternatively, the driver 217 receives information from the gateway 203 via link 221 and hardware 219. The driver can be a network operating system with a network interface card in the client computer, for example.

From the physical connection 221, the information traverses to the gateway 203. The gateway has a physical layer 223, which interacts with driver 225. The gateway also includes a networking layer 227 and a transport layer 229, which is coupled to a translation module 231. The networking layer 227 determines whether the information can be routed over the satellite protocol. If so, the data is passed up to the transport layer 229. If not, the data is immediately forwarded out to the rate control module 234 for delivery to the satellite link 239 in non-translated form. The translation module 231 converts the information into a satellite protocol 233, which is suitable for use over a satellite link. A rate control module 234 determines whether the information can be passed immediately to the satellite connection or be queued for later delivery. The satellite connection is coupled to a physical layer 237 by a driver 235, which transmits information to and from satellite 209. The information traverses to and from the satellite in a wireless medium, 239, 241.

Information is received by the satellite gateway 205, which includes multiple layers, physical and others. The physical layer 243 couples to driver 245. The networking and transport layer include a satellite protocol 247 and a rate control 244. The network and transport layers connect to a session layer which comprises translation module 249. The translation module converts the information using the satellite protocol back to TCP/IP. The information traverses through the transport layer (i.e., TCP) 251 and the networking layer (i.e., IP) 253. Information from the satellite gateway 205 enters a physical layer 257 through driver 255. The driver transmits the information to a server 207 over telecommunications link 259. Driver 255 can also receive information from server 207 in the backward path.

From the telecommunications link 259, the information is sent to driver 263 in the server 207 via physical layer 261. The information traverses from the driver to a networking layer, which includes IP 265. The information also traverses from the networking layer to a transport layer, which includes TCP 267. The information is delivered to a Web server application 269, for example. Between the server 207 and the satellite gateway 205 is the Internet or, another IP network, depending upon the application.

In a specific embodiment, information can flow through a gateway, such as gateway 203, 205 at the network layer, bypassing the transport and application layers altogether. For example, in gateway 203, information can enter from client 201 via telecommunications link 221. Physical layer 223 passes the information to driver 225. In turn, driver 225 passes the information to network layer 227. Network layer 227 can route the information to its destination using IP. The information then flows from network layer 227 to driver 235. Driver 235 interacts with physical layer 237 to pass the information along to satellite 209 via telecommunications link 239.

In a specific embodiment, the translation module converts information using a TCP connection to a suitable connection for transmission over a satellite system. The suitable connection for the satellite is generally resilient to transmission over a wireless network such as a satellite network, e.g., Orion Worldcast™ PanAmSat™ Spotbytes™ services, and the like. The connection should also be suitable for long latency, high loss, and asymmetric bandwidth conditions. The connection should also be transparent to the end user at the client or server location. The long latency is typically about 200 milliseconds to about 700 milliseconds per satellite hop but is not limited to such values.

Figure 2A:
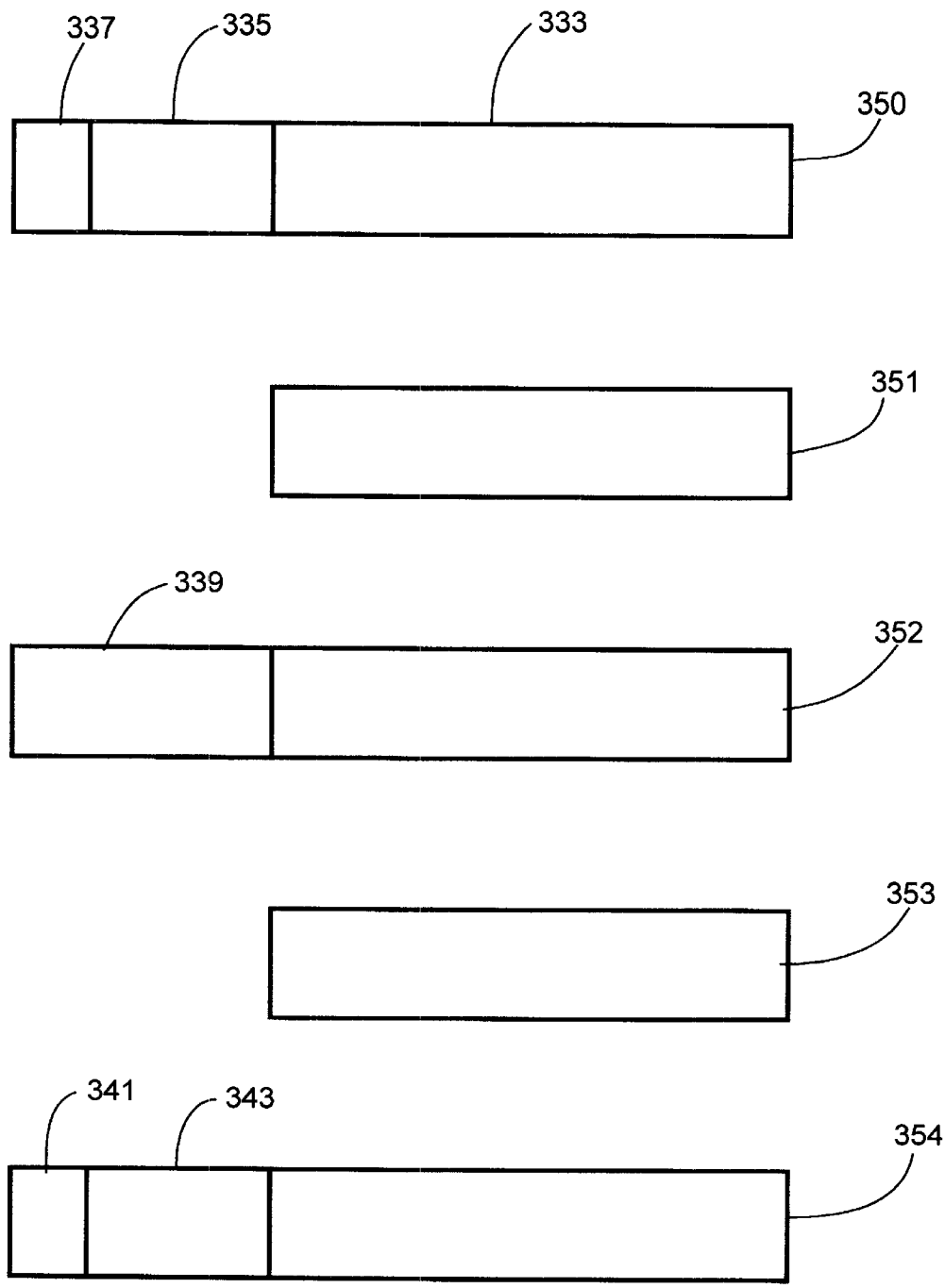

In a specific embodiment, the present translation module converts information using a TCP connection into an XTP, modified TCP or XTP-like protocol for transmission over a satellite link, which is illustrated by FIG. 2A, for example. Here, the TCP module receives information 350 including the TCP connection. The information includes data 333, a TCP header 335, and an IP header 337. The TCP module removes the TCP header from the information such that the information 351 includes substantially all data 333 and passes the data, along with certain TCP header information, to the translation module. The translation module passes the data or portions of data to the satellite protocol module where a satellite protocol header 339 is prepended onto the data. The header is an XTP header or like. The information 352 now includes the XTP header, which is suitable for transmission over the satellite link. Depending on the specific implementation, the XTP header and data may also be prepended with an IP header for transmission over the satellite link. In particular, the information is transferred to the physical layer and the driver. The driver and physical layer send the information to a receiving satellite gateway, which may prepend additional headers.

From the satellite link, the information including the XTP header enters a receiving XTP module. The receiving XTP or satellite protocol module removes the XTP header from the information, leaving data 353. The receiving satellite protocol module passes the data to the translation module, which can be a routing module used to route data to the proper protocol. The translation module then passes the data to the TCP module. The receiving TCP module attaches a TCP header 343 and IP header 341 onto the data to form information that is now ready for transmission over a network to a receiving server destination. The information using the TCP connection traverses through a network to the destination server.

In other embodiments, the translation module can also convert a portion of the information including the data and TCP/IP headers to information using the XTP protocol. Alternatively, the translation module can convert more than one segment of information including multiple TCP/IP headers into a single piece of information including the XTP header for transmission over a satellite link. Depending upon the application, the translation module can convert the information including the TCP connection into any one or any combination of the above. Further details of these methods, and others, are described in more detail below.

Figure 3A:
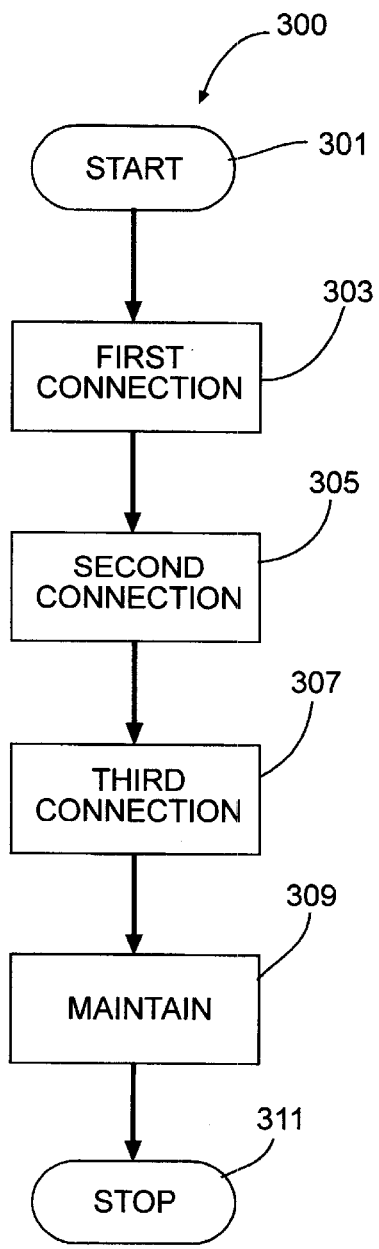
FIGS. 3A–3G are simplified diagrams of process diagrams according to embodiments of the present invention.
Figure 3B:
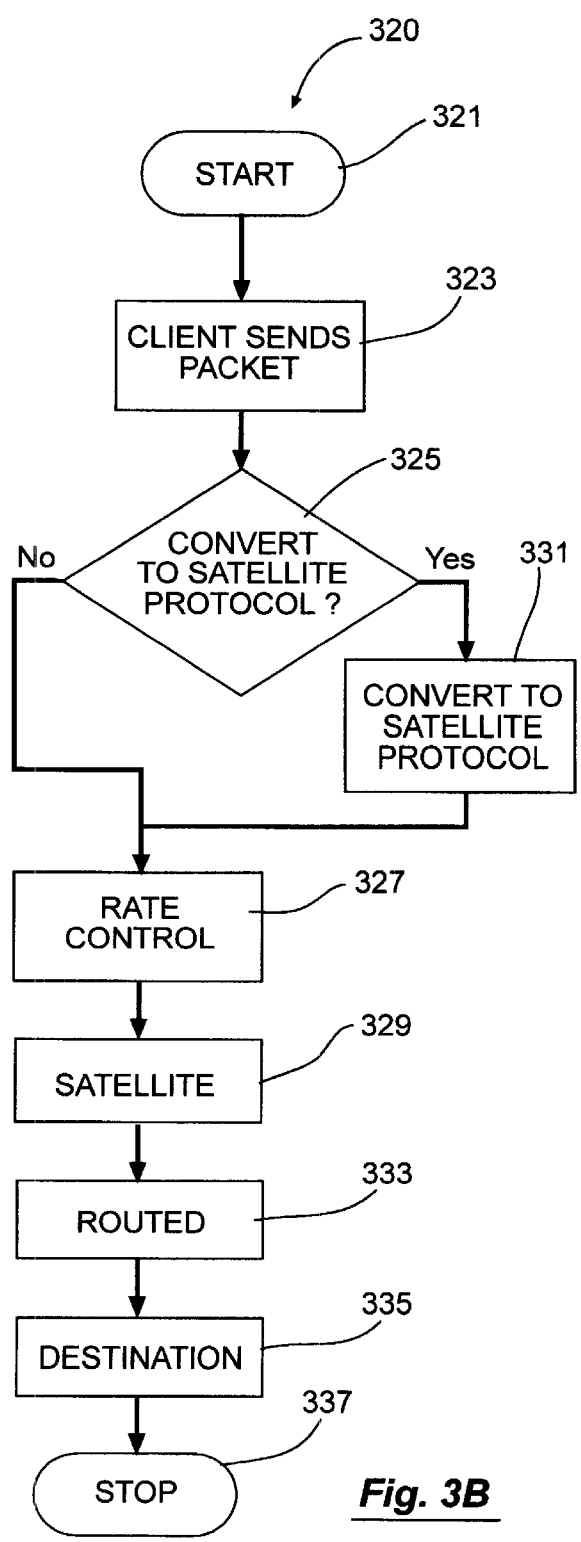

FIGS. 3A and 3B are simplified diagrams of process diagrams according to embodiments of the present invention. These diagrams are merely illustrations and should not limit the scope of the claims herein. One of ordinary skill in the art would recognize other variations, modifications, and alternatives. In a specific embodiment, the present invention uses a connection process 300, which is illustrated by FIG. 3A. The connection process uses a plurality of separate connections using a "handshaking routine" in the satellite system to provide a transparent TCP connection to an end user. The satellite system can be similar to the one described herein, but is not limited. The present process begins at start, step 301. In a specific embodiment, a plurality of connections are provided. In particular, the present process provides a first connection, step 303. The first connection is a TCP connection between a client and a client side gateway, which interfaces to a satellite link. The present process provides a second connection, step 305, which provides a connection between the client side gateway and a destination gateway over a wireless (e.g., satellite) link. The connection between the wireless link can be any suitable connection such as XTP or XTP-like connection. The present process provides a third connection, step 307, which forms a TCP connection between the destination gateway to the destination server, which can traverse through the Internet or an internet. Once these connections have been made they are maintained, step 309. The present process ends at stop 311, which terminates all three connections.

In a specific embodiment, the present process occurs by way of a selected sequence of steps. Here, TCP SYN packets are intercepted transparently by a satellite gateway. The satellite gateway establishes a new XTP connection across the satellite link to the other satellite gateway. Information, including IP addresses and port numbers, about the requesting client and the destination server is transferred across the satellite link to the other satellite gateway. The destination gateway then sets up a TCP connection with the destination server, using the client's addressing information so that the server sees the TCP connection as being the same as if the client itself had established the connection. The satellite gateway makes routing decisions based upon source and destination addresses in the IP header of packets entering the gateway in order to determine whether the packets should be routed over the satellite telecommunications link. Once the TCP connection to the server is established, the destination gateway communicates back to the sending gateway, which then acknowledges the connection with the client.

In one or more embodiments, this sequence of steps has advantages. In particular, the client does not believe the connection is established until the server has accepted this connection, which tends to reduce or even eliminate false indications of successful connection establishment. Additionally, both the client and server see the connection as happening immediately between the two of them, without detecting that the satellite connection is happening in between the client and the server. That is, the present invention substantially preserves "end-to-end semantics" of the connection. In other embodiments, the connectivity is symmetric. Here, "clients" may exist on either side of the satellite link, and "servers" may exist on either side. Systems on either side may request connections to systems on the other side, and the satellite gateways will intercept the connections.

FIG. 3B illustrates a simplified flowchart of a novel routing process 320 in a specific embodiment according to the present invention that begins with a starting step 321. This diagram is merely an example which should not limit the scope of the claims herein. One of ordinary skill in the art would recognize other variations, modifications, and alternatives. In a step 323, a client host sends a TCP packet destined for a particular IP address to a satellite gateway. In an example, the satellite gateway can be similar to the one 111A described above, but can also be others. In a decisional step 325, the satellite gateway receives the packet and determines whether the packet is to be carried over an XTP connection prior to transmission. An example of an XTP protocol has been described herein, but should not limit the scope of the claims. Any suitable satellite protocol can be used according to certain embodiments of the present invention. If the destination address of the TCP packet is configured to be converted to the XTP protocol format, then the packet is converted into the XTP protocol in a step 331. Otherwise, the packet is transmitted in its TCP format via an alternative branch to step 327. By way of the present decisional process, the present invention is useful for sites where a single satellite gateway communicates with multiple remote sites, some of which have gateways that are compatible with XTP protocol while other sites do not contain corresponding gateways. Additionally, the present invention allows specific addresses to be configured for protocol translation and other addresses to be configured for no translation, based on policy decisions of the network administrator.

In a specific embodiment, the present invention also provides a rate control step (step 327). In a step 327, processing is performed to maintain a suitable or predetermined data rate over the satellite device. The processing of step 327 may require buffering of packets in order to avoid overloading the satellite link, such as 105 and 103 in FIG. 1. This can be accomplished using the process depicted by FIGS. 3C-3D, but is not limited to this process. Then, in a step 329, the packet is transmitted along a connection established between transmitted from the sending satellite gateway across the satellite link. Then, in a step 333, the packet is converted back to TCP, if it was converted to XTP protocol in step 331. Then, in a step 335, the packet is routed to its remote destination.

The present method is especially useful for sites where a single satellite gateway communicates with multiple remote gateways, some of which are compatible with XTP protocol while others of the remote gateways are not. Some configurations may have multiple remote sites per satellite gateway. Some of these remote sites may have a satellite gateway installed, while others do not. Thus, there may be no satellite gateway on the remote side, just a IP routing configuration. The process completes routing (step 335) when the information enters a destination server 131, which transfers the information to a destination client. The process stops (step 337) when the connection is terminated.

In a particular embodiment according to the present invention, TCP connections at times pass a piece of information in the protocol header which must be delivered as soon as possible to the destination side of the connection. This piece of information is known as the "urgent pointer". In select embodiments, the TCP implementation that is part of the client-side satellite gateway, such as for example satellite gateway 203 of FIG. 2, can extract this urgent pointer from the TCP header. However, this operation is not required by the system of FIG. 2 and is not intended to limit the scope of the claims. A TCP module, such as TCP module 229 of FIG. 2, for example, can extract the urgent pointer and pass it to a satellite gateway translation module, which can be satellite gateway translation module 231 of FIG. 2, or an equivalent. The urgent pointer is passed down to a satellite protocol module, such as satellite protocol module 233 of FIG. 2, or an equivalent. The urgent pointer can then be carried in the satellite protocol header to a satellite gateway, such as satellite gateway 205 of FIG. 2, or any other receiving satellite gateway. At the receiving satellite gateway, the urgent pointer can be extracted by a satellite protocol module, such as satellite protocol module 247 of FIG. 2, and passed up to a translation module, such as translation module 249, or another satellite translation module, which can deliver it to a TCP module, such as TCP module 251. The TCP module then incorporates the urgent pointer in its target field in the TCP header for immediate delivery to an end server, such as end server 207. This header for delivery to the server refers to the point in the data stream that has not yet arrived at the second satellite gateway machine. In some embodiments, appropriate urgent pointer processing can alleviate malfunctions.

Figure 3C:
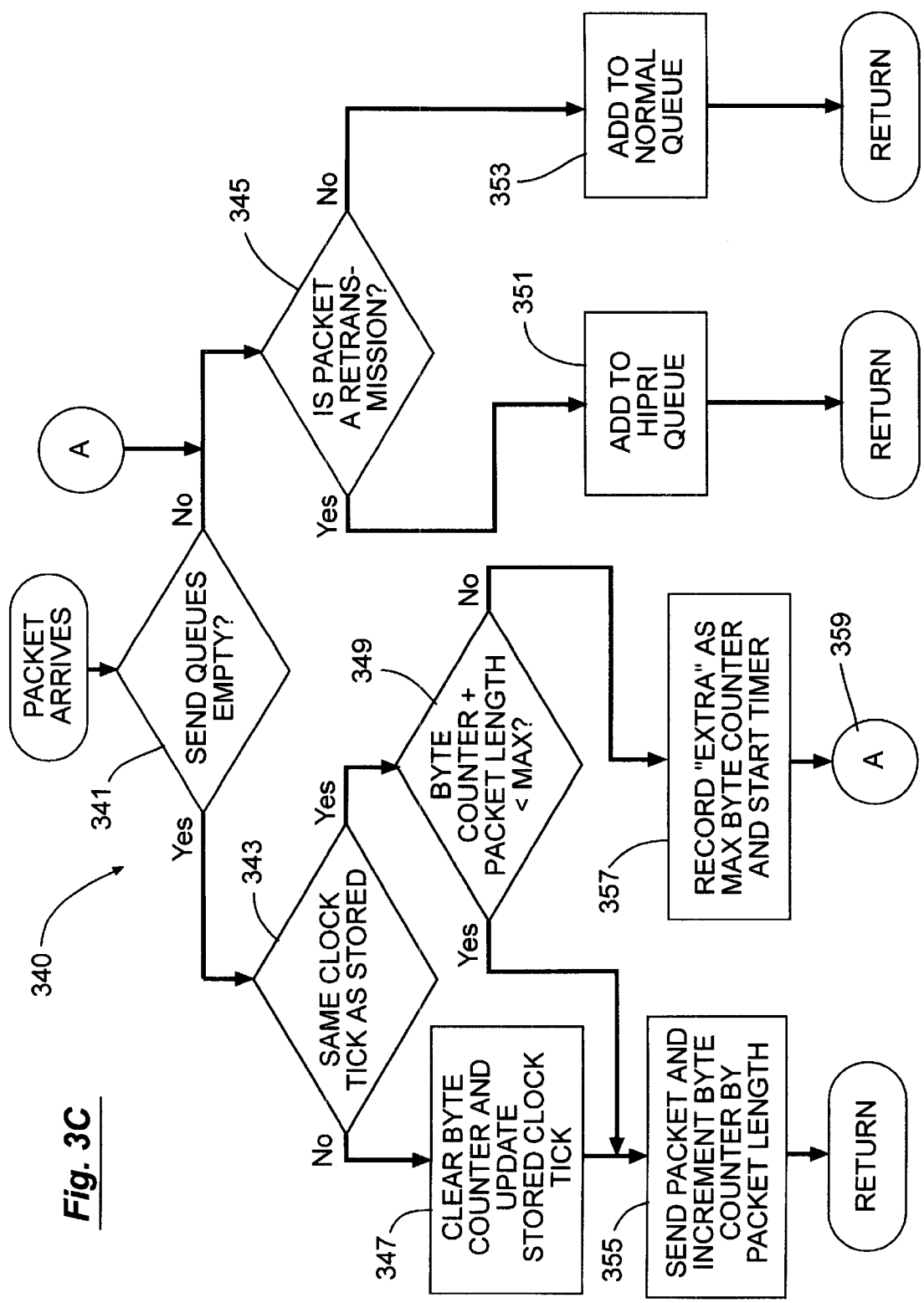

FIG. 3C illustrates a simplified flowchart of a data rate control process such as data rate control step 327 in FIG. 3B in a specific embodiment according to the present invention. This diagram is merely an example which should not limit the scope of the claims herein. One of ordinary skill in the art would recognize other variations, modifications, and alternatives. FIG. 3C shows a first decisional step 341 of determining whether queues are empty when an incoming packet arrives. In a presently preferable embodiment, there are two queues, one for queuing high priority (HIPRI) traffic and one for queuing "normal" traffic. A person of ordinary skill in the art can appreciate that the number of queues can be extended or reduced by straightforward extensions of the methods according to the present invention. If the queues are empty, then processing continues with a decisional step 343. Otherwise, processing continues with a decisional step 345.

Decisional step 343 determines whether the current system clock tick count is the same as a stored clock tick count. If the system clock tick and the stored clock tick are the same, then processing continues with decisional step 349, which determines whether a byte counter and a length of an incoming packet are greater than a predetermined maximum, based on the desired transmission rate, denoted here as "MAX". If the maximum would not be exceeded, then processing continues with step 355, in which the packet is sent and the byte counter is incremented by the packet length. Otherwise, if the maximum would be exceeded in step 349, then processing continues with a step 357, in which the difference between MAX and the current value of the byte counter is stored as "EXTRA", and a timer can be started. Processing then continues at step 345. Otherwise, if step 343 determines that the clock tick and stored clock tick are different, processing continues with a step 347 in which a byte counter is cleared and the stored clock tick is updated. Processing then continues with a step 355, as described above.

If decisional step 341 determines that at least one of the queues is not empty, or if the packet length would have increased the byte counter beyond MAX in step 349, then in a decisional step 345, a determination is made whether the incoming packet is a retransmission. If the packet is a retransmission, then in a step 351, the packet is added to the high priority (HIPRI) queue. Otherwise, in a step 353, the packet is added to the normal queue.

Figure 3D:
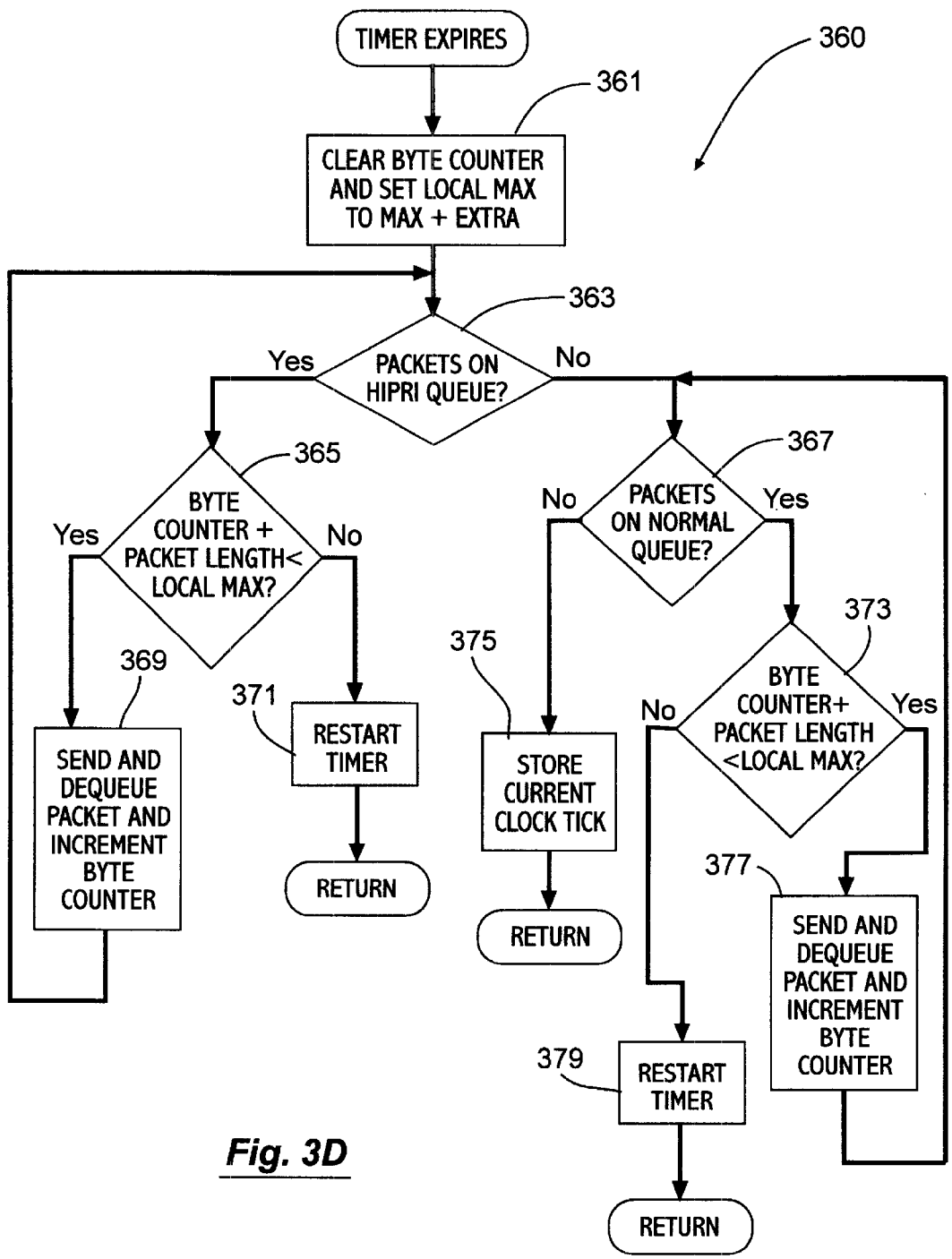

FIG. 3D illustrates a simplified flowchart of a timer service process useful in conjunction with data rate control process illustrated by FIG. 3C in a specific embodiment according to the present invention. This diagram is merely an example which should not limit the scope of the claims herein. One of ordinary skill in the art would recognize other variations, modifications, and alternatives. FIG. 3D shows a step 361 invoked whenever a timer set in step 357 expires. In step 341, the byte counter is cleared and the local maximum is set to the maximum MAX added to EXTRA. Then, in a decisional step 363, the high priority (HIPRI) queue is checked to determine whether packets are on the queue. If there are packets on the HIPRI queue, then processing continues with a decisional step 365. Otherwise, processing continues with a decisional step 367.

If there are packets on the HIPRI queue, then in a decisional step 365, a determination is made whether the byte counter and the packet length are less than a local maximum. If this is indeed the case, then processing continues with a step 369 in which the packet is dequeued from the HIPRI queue and sent. Also, the byte counter is incremented to reflect the length of the data in the packet. Otherwise, if decisional step 365 determines that the byte counter and the packet length exceed the local maximum, then in a step 371 the timer is restarted and processing returns to the invoking process. Processing can continue when the timer expires.

If decisional step 363 determines that there are no packets on the HIPRI queue, then processing continues with a decisional step 367. Decisional step 367 determines whether there are packets on the normal queue. If there are no packets on the normal queue, then processing continues with a step 375, in which the current clock tick is stored in a global cell. Otherwise, if decisional step 367 determines that packets are on the normal queue, then processing continues with a decisional step 373, in which a determination is made whether the byte counter and the packet length are less than the local maximum. If this is indeed the case, then processing continues with a step 377, in which the packet is dequeued from the normal queue and sent. Also, the byte counter is incremented to reflect the length of the data in the packet. Otherwise, if decisional step 373 determines that if the byte counter and the packet length exceed the local maximum, then in a step 379 the timer is restarted and processing returns to the invoking process. Processing can continue when the timer expires.

Figure 3E:
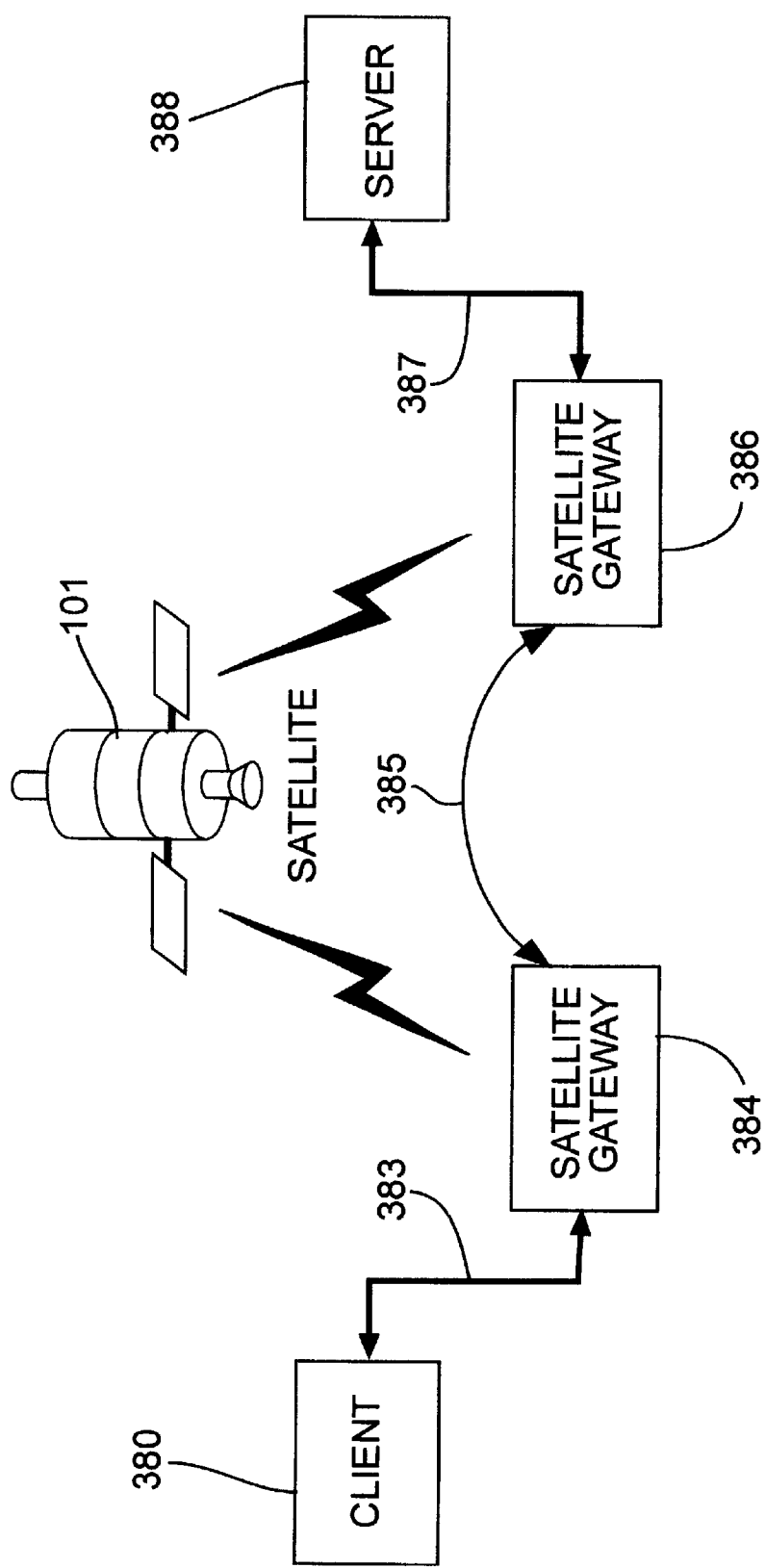

FIG. 3E illustrates a representative system overview in a particular embodiment according to the present invention. This diagram is merely an example which should not limit the scope of the claims herein. One of ordinary skill in the art would recognize other variations, modifications, and alternatives. A client 380 initiates a connection request to a TCP server 388. Satellite gateway 384 intercepts the connection request and establishes a second connection 385 with a second Satellite gateway 386. The second satellite gateway 386 then initiates a third connection 387 with the server 388. Once connection 387 is established and that information has been communicated back to the satellite gateway 384, the first TCP connection 383 can be confirmed between the client 380 and satellite gateway 384. Although depicted in terms of satellite and satellite gateways, the present invention can also be embodied in other forms of network hardware. For example, first gateway 384 and second gateway 386 can be connected by a wireless network and the like.

Figure 3F:
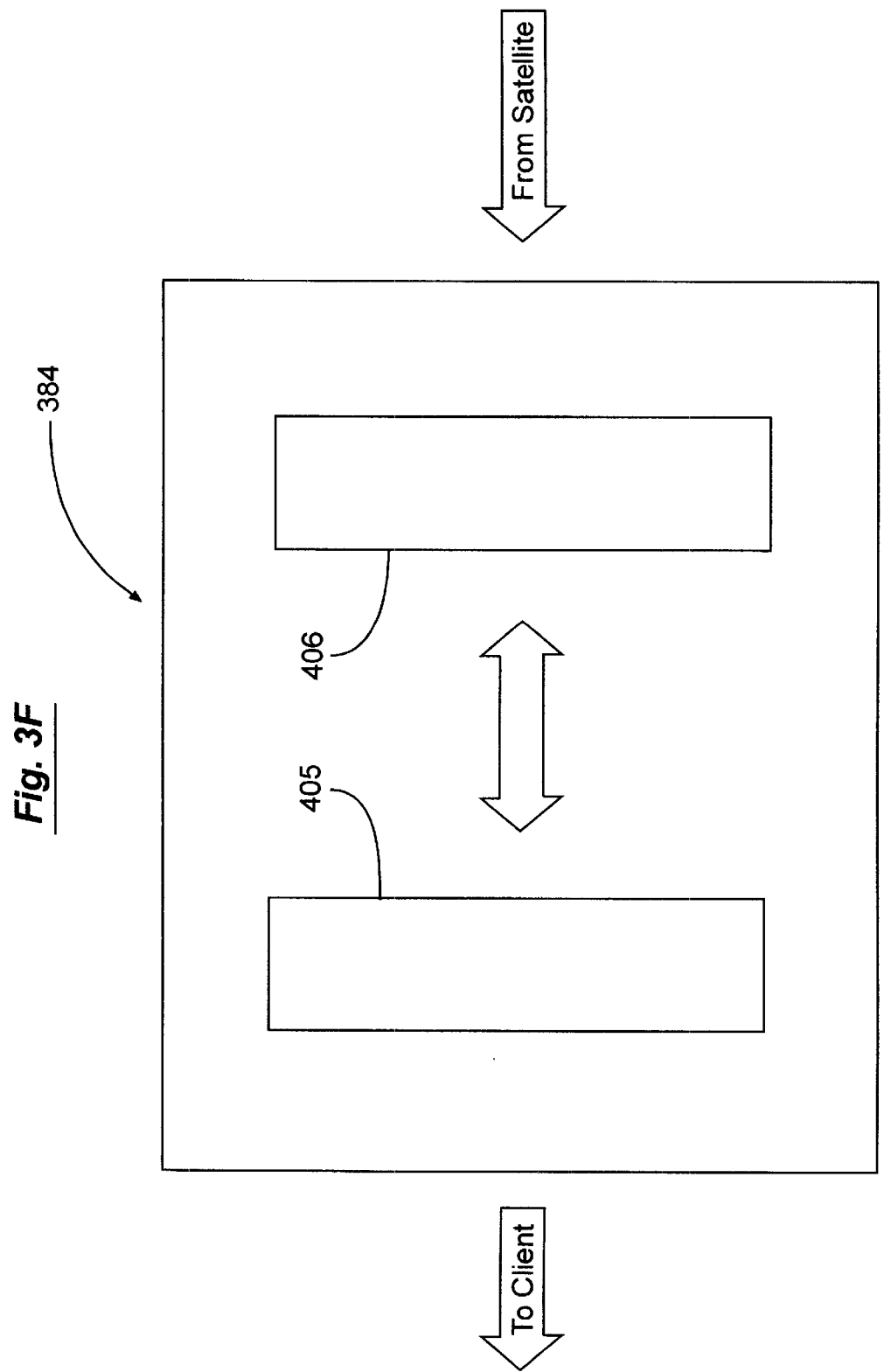

FIG. 3F illustrates a simplified structure component diagram of a representative buffer architecture of a particular embodiment according to the present invention. This diagram is merely an example which should not limit the scope of the claims herein. One of ordinary skill in the art would recognize other variations, modifications, and alternatives. FIG. 3F illustrates a satellite gateway 384. Satellite gateway 384 comprises a TCP buffer 405, that interfaces with a client, such as client 380 of FIG. 3E via connection 383. Further, satellite gateway 384 comprises a satellite protocol buffer 406, that interfaces with a satellite, such as satellite 101 of FIG. 3E via connection 385. TCP over satellite systems can temporarily store data in one or more buffers controlled by the TCP protocol layer and the satellite protocol layer in satellite gateway 384. Data to an endpoint, such as client 380 of FIG. 3E, for example, can be delivered from one or more TCP buffers, such as TCP buffer 405. As space becomes available in TCP buffer 405, data can be transferred from satellite protocol buffer 406 to TCP buffer 405. As space becomes available in satellite protocol buffer 406, the satellite protocol can permit more data to be sent across the satellite link, such as satellite link 385 in FIG. 3E, for example. In a representative example of an application of an embodiment according to the present invention, a satellite gateway, such as satellite gateway 384 can feed data to a plurality of modems. The modem links cannot accept data at the same rate as the satellite link. In such a situation, techniques according to the present invention can circumvent expending relatively large amounts of buffer space for holding data for the modems.

Figure 3G:
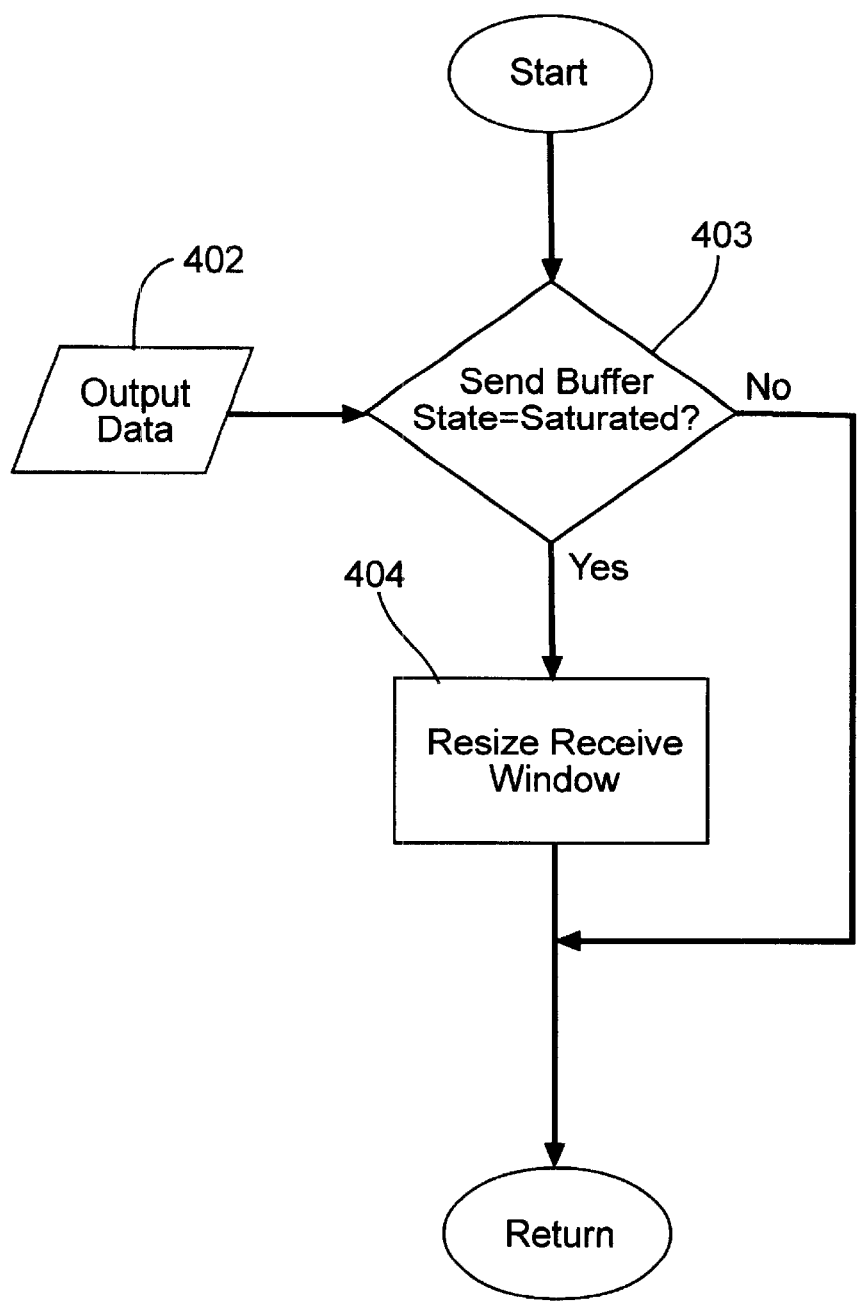

FIG. 3G illustrates a simplified flowchart of a connection memory management process in a particular embodiment according to the present invention. This diagram is merely an example which should not limit the scope of the claims herein. One of ordinary skill in the art would recognize other variations, modifications, and alternatives. FIG. 3G illustrates output data 402, that can reside in satellite protocol buffer 406 of FIG. 3F, for example. When data is not being delivered from the TCP layer to the end client at an acceptable rate, congestion in the satellite link can occur. This congestion can be detected by the satellite protocol in a decisional step 403, wherein the satellite protocol determines whether a state of the satellite protocol buffer 406 has become saturated. In some embodiments, a threshold can be established for the buffer. Exceeding this threshold can indicate a saturation condition is present. If the protocol buffer has become saturated, then in a step 404, the satellite protocol reduces a maximum receive window for data that will be accepted across the satellite link 385 by a reduction factor. In a presently preferable embodiment, a reduction factor of 50% can be used. In a particular embodiment, an minimum value for the receive window can be configured to assure that the window is not reduced to zero. Otherwise, if a client is receiving at a data rate comparable to the data rate of the system, then the saturation condition will not be reached.

In a particular embodiment according to the present invention, a connection to a receiver, such as client 384, for example, that has a relatively slow data rate, can start with a full-sized receive window. Using the techniques according to the present invention, the receive window can be resized to achieve a match between the data rate of the sender and the data rate of the receiver. Thus, in some embodiments, new connections can have the capability of consuming a full window of memory before the system detects the lower data rate condition and restricts how much additional new data will be buffered for the connection. In a presently preferable embodiment, the techniques of the present invention can be applied to each satellite connection separately, so that one slow receiver will not degrade performance of other connections over the same link.

Although the above has generally described the present invention according to specific systems and methods, the present invention has a much broader range of applicability. In particular, the present invention is not limited to satellite telecommunications, but can be applied to any networking situation where an improved or optimized protocol is desired for use over a specific portion of the network, and the end systems cannot be updated to use the improved protocol. Thus, in some embodiments, satellite gateways could provide access to wireless or cabled networks and internetworks of all kinds. Of course, one of ordinary skill in the art would recognize other variations, modifications, and alternatives.

Experiment

Figure 4:
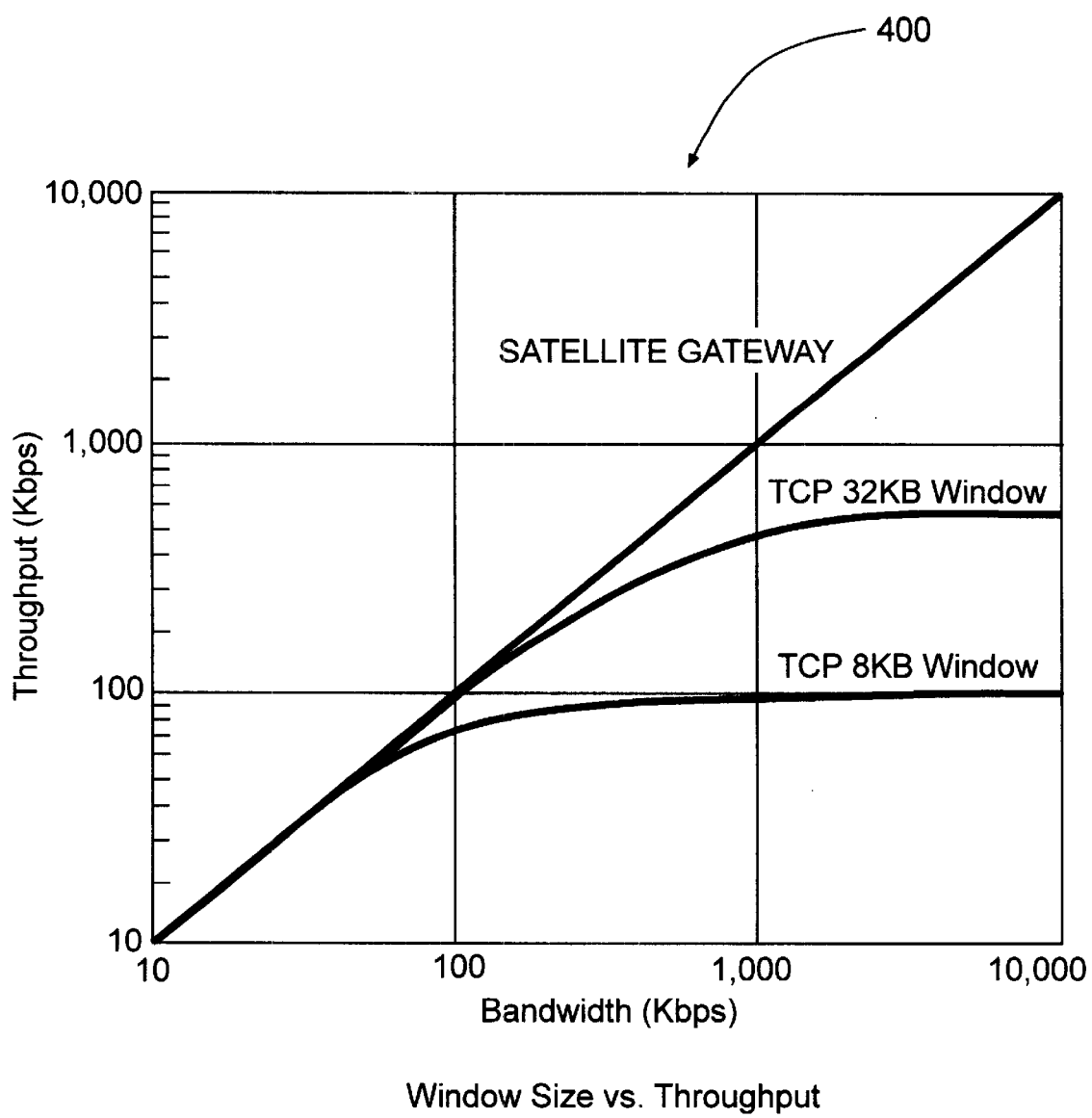
FIGS. 4–6 are simplified diagrams of experimental data according to embodiments of the present invention.

To prove the principles and operation of the present system, experiments have been performed. In the present experiments, we ran a series of single-client FTP file transfer throughput tests to compare performance of conventional TCP and the present invention over a wide variety of different TCP windows sizes, link bandwidths, round trip delay times, and bit error rates. In one experiment, "Window Size" was compared against "Throughput", as shown by the simplified diagram 400 of FIG. 4, for example. This diagram is merely an example and should not limit the scope of the claims herein. One of ordinary skill in the art would recognize other variations, modifications, and alternatives. Without performance enhancements or TCP window size tuning, most clients were limited to a throughput rate of less than 100 Kbps when the round trip time was 540 ms. As the test data in FIG. 4 show, even clients with a 32 KB window were able to reach a throughput of a mere 400 Kbps. The present system allowed the client to take advantage of the available bandwidth regardless of the window size of the client or server.

Figure 5:
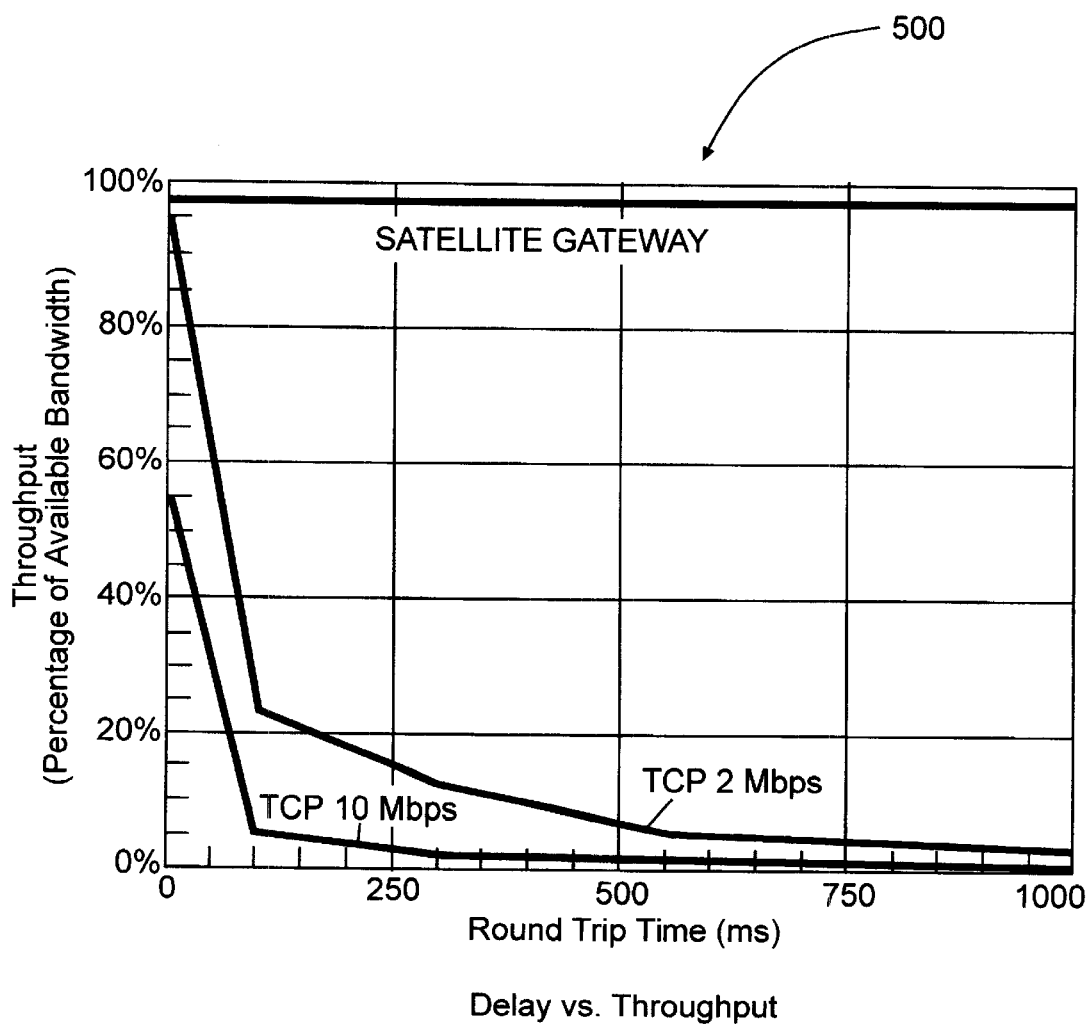

In an alternative experiment, a "Round Trip Delay" was analyzed against "Throughput," as shown in a simplified diagram 500 of FIG. 5, for example. This diagram is merely an example and should not limit the scope of the claims herein. One of ordinary skill in the art would recognize other variations, modifications, and alternatives. Here, the present invention removed the dependency of TCP on the round trip time of the network. Performance was measured over symmetric 2 Mbps and10 Mbps links with no errors. These results illustrate that TCP is able to fully saturate terrestrial low-delay networks, but as the delay increases, TCP performance dropped rapidly. In contrast, a network which used the present system was able to maintain broad near complete usage of the link regardless of the round trip time of the network.

Figure 6:
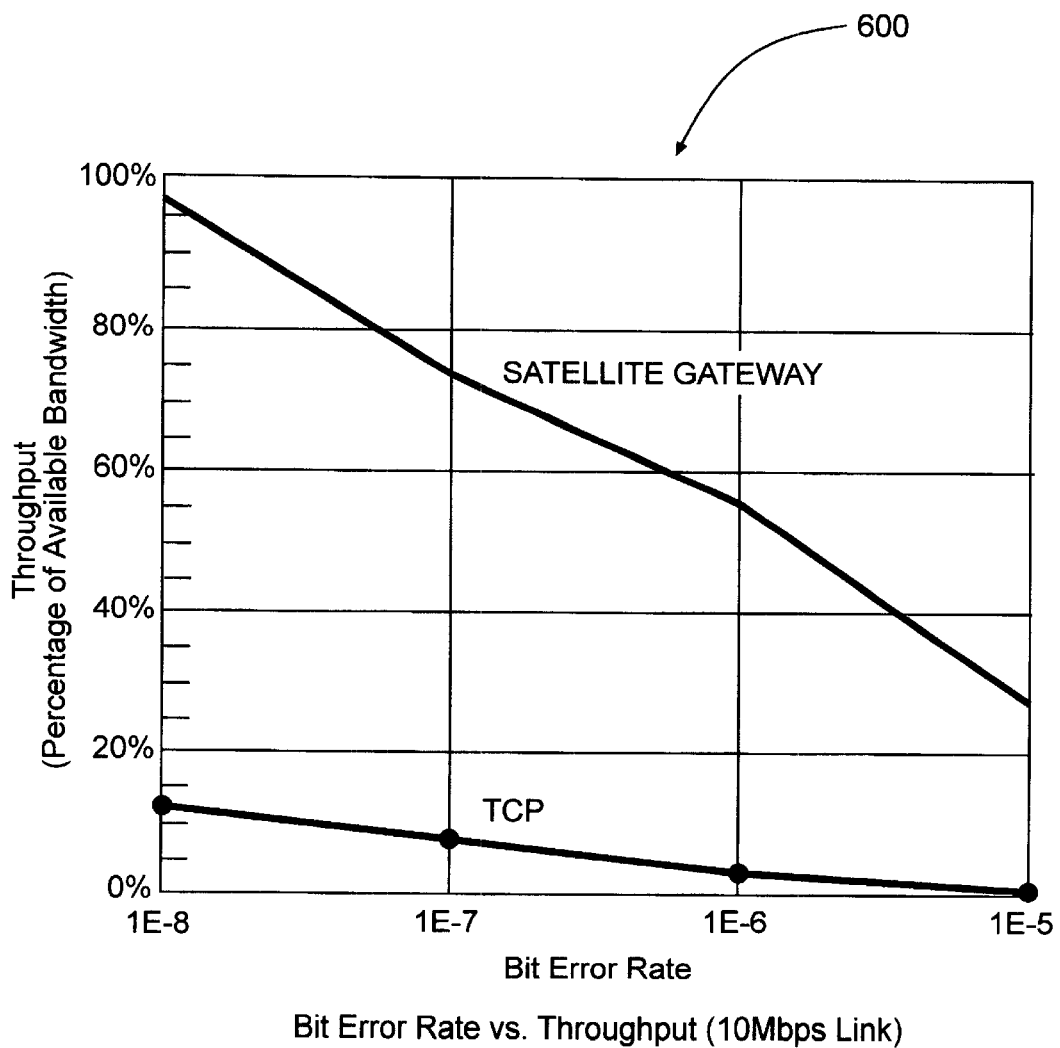

In an alternative experiment, a "Bit Error Rate" was monitored against "Throughput," which is shown by the simplified diagram 600 of FIG. 6, for example. This diagram is merely an example and should not limit the scope of the claims herein. One of ordinary skill in the art would recognize other variations, modifications, and alternatives. Networks which incorporated the present invention were also sensitive to the bit error rate of the link. The diagram shows throughput as a function of the bit error rate for a symmetric10 Mbps satellite network with a 540 ms round trip time and a TCP window size of 1 MB. Even at low error rates, TCP was able to deliver a mere 1.2 Mbps. At an error rate of $1.0 \times 10^{-5}$, TCP's throughput dropped to 0.05 Mbps. A network which used the present system was able to fully saturate the link at low error rates and delivered 2.7 Mbps even at an error rate of $1.0 \times 10^{-5}$.

While the above is a full description of the specific embodiments, various modifications, alternative constructions and equivalents may be used. For example, the above has generally been described in terms of using XTP as a satellite protocol. Other types of protocols may be available. For example, the protocol can include a modified TCP or the like. Therefore, the above description and illustrations should not be taken as limiting the scope of the present invention which is defined by the appended claims.

What is claimed is:

1. A method for managing memory for buffering information, said information comprising a plurality of packets, each of said packets comprising data and a header, in a system comprising a client, selected from a plurality of potential clients;

a server, selected from a plurality of potential servers;

a first gateway, connected to said client by a first telecommunications link, said first gateway comprising a first buffer and a second buffer;

a second gateway, connected to said server by a second telecommunications link;

a third telecommunications link connecting said first gateway to said second gateway, said method comprising:

intercepting a connection attempt with said server using said first gateway, said connection attempt initiated by said client, said client capable of establishing connections at a first characteristic data rate;

establishing a connection between said first gateway and said second gateway over said third telecommunications link, said connection having a second characteristic data rate; wherein said first buffer stores information received over said third telecommunications link and said second buffer stores information for said client;

setting an initial receive window size for said client at said first gateway;

determining a state in said second buffer, said state indicating if said second characteristic data rate in said third telecommunications link is greater than said first characteristic data rate for said client; and resetting said receive window size for said client at said first gateway to reduce an amount of data received over said third telecommunications link for said client, if the state in the second buffer indicates said second characteristic data rate is greater than said first characteristic data rate.

2. The method of claim 1 wherein said state comprises a buffer full condition.

3. The method of claim 1 wherein said state comprises a threshold value for buffer contents has been reached.

4. The method of claim 1 wherein said setting said receive window size comprises reducing a receive window size by about 50%.

5. The method of claim 1 wherein said connection attempt by said client with said server comprises a TCP protocol.

6. The method of 1, wherein said connection between said first gateway and said second gateway comprises a satellite protocol.

7. The method of claim 6 wherein said satellite protocol further comprises an XTP protocol.

8. A computer program product for managing memory for buffering information, said information comprising a plurality of packets, each of said packets comprising data and a header, in a system comprising a client, selected from a plurality of potential clients;
   a server, selected from a plurality of potential servers;
   a first gateway, connected to said client by a first telecommunications link, said first gateway comprising a first buffer and a second buffer;
   a second gateway, connected to said server by a second telecommunications link;
   a third telecommunications link connecting said first gateway to said second gateway, said computer program product comprising:
   code for intercepting a connection attempt with said server, said connection attempt initiated by said client, said client capable of establishing connections at a first characteristic data rate;
   code for establishing a connection between said first gateway and said second gateway over said third telecommunications link, said connection having a second characteristic data rate; wherein said first buffer stores information received over said third telecommunications link and said second buffer stores information for said client;
   code for setting an initial receive window size for said client at said first gateway;
   code for determining a state in said second buffer, said state indicating if said second characteristic data rate in said third telecommunications link is greater than said first characteristic data rate for said client;
   code for resetting said receive window size for said client at said first gateway to reduce an amount of data received over said third telecommunications link for said client, if the state in the second buffer indicates said second characteristic data rate is greater than said first characteristic data rate; and
   a computer readable storage medium for holding the codes.

9. The computer program product of claim 8 wherein said state comprises a buffer full condition.

10. The computer program product of claim 8 wherein said state comprises a threshold value for buffer contents has been reached.

11. The computer program product of claim 8 wherein said code for setting said receive window size comprises code for reducing a receive window size by about 50%.

12. The computer program product of claim 8 wherein said connection attempt by said client with said server comprises a TCP protocol.

13. The computer program product of claim 8, wherein said connection between said first gateway and said second gateway comprises a satellite protocol.

14. The computer program product of claim 13 wherein said satellite protocol further comprises an XTP protocol.

15. A system for managing memory for buffering a flow of information over a satellite, said system comprising:
   a client, selected from a plurality of potential clients;
   a server, selected from a plurality of potential servers;
   a first gateway, connected to said client by a first telecommunications link, said first gateway comprising a first buffer and a second buffer;
   a second gateway, connected to said server by a second telecommunications link;
   a third telecommunications link connecting said first gateway to said second gateway; wherein said first gateway is operatively disposed to:
   intercept a connection attempt with said server, said connection attempt initiated by said client, said client capable of establishing connections at a first characteristic data rate;
   establish a connection between said first gateway and said second gateway over said third telecommunications link, said connection having a second characteristic data rate; wherein said first buffer stores information received over said third telecommunications link and said second buffer stores information for said client;
   set an initial receive window size for said client at said first gateway;
   determine a state in said second buffer, said state indicating if said second characteristic data rate in said third telecommunications link is greater than said first characteristic data rate for said client; and
   reset said receive window size for said client at said first gateway to reduce an amount of data received over said third telecommunications link for said client, if the state in the second buffer indicates said second characteristic data rate is greater than said first characteristic data rate.

16. The system of claim 15 wherein said state comprises a buffer full condition.

17. The system of claim 15 wherein said state comprises a threshold value for buffer contents has been reached.

18. The system of claim 15 wherein said setting said receive window size comprises reducing a receive window size by about 50%.

19. The system of claim 15 wherein said connection attempt by said client with said server comprises a TCP protocol.

20. The system of claim 15 wherein said connection between said first gateway and said second gateway comprises a satellite protocol.

21. The system of claim 20 wherein said satellite protocol further comprises an XTP protocol.

22. The method as in claim 1 wherein said first and second gateways are substantially identical.

23. The method as in claim 1 wherein said third telecommunications link comprises a bi-directional telecommunications link.

24. The method as in claim 1 wherein said intercepting said connection attempt comprises terminating said connection attempt at said first gateway, and said establishing said connection comprises initiating said connection between said first and second gateways.

25. The method as in claim 24 wherein said connection attempt comprises a data portion and a header, and wherein:

said terminating said connection attempt comprises removing said header; and said establishing said connection comprises adding a second header.

26. The method as in claim 1 wherein said determining said state and said resetting said receive window size are iteratively repeated.

27. The method as in claim 22 wherein said substantially identical first and second gateways further comprise a substantially identical functionality.

28. The system as in claim 15 wherein said first and second gateways comprise a substantially identical functionality.

29. The method as in claim 24 wherein said establishing said connection comprises initiating a second connection between said first and second gateways, said second connection comprising an independent protocol connection between said first and second gateways.

\* \* \* \* \*